(12) United States Patent
Terry

(10) Patent No.: US 9,108,556 B2
(45) Date of Patent: Aug. 18, 2015

(54) VERTICAL LIFTING AXLE FOR A CASK TRANSPORTER

(75) Inventor: Melvin Dean Terry, Mount Vernon, WA (US)

(73) Assignee: INTELLIPORT CORPORATION, Mount Vernon, WA (US)

( * ) Notice: Subject to any disclaimer, the term of this patent is extended or adjusted under 35 U.S.C. 154(b) by 945 days.

(21) Appl. No.: 13/298,034

(22) Filed: Nov. 16, 2011

(65) Prior Publication Data

US 2013/0121796 A1     May 16, 2013

(51) Int. Cl.
*B60P 1/00*     (2006.01)

(52) U.S. Cl.
CPC ........................................ *B60P 1/00* (2013.01)

(58) Field of Classification Search
CPC .................................. F01B 29/08; B60G 1/00
USPC ............................................................. 92/109
See application file for complete search history.

(56) References Cited

U.S. PATENT DOCUMENTS

| | | | |
|---|---|---|---|
| 2,823,813 A * | 2/1958 | Shimmon | 414/541 |
| 3,698,581 A | 10/1972 | Goyarts | |
| 4,256,230 A | 3/1981 | Clark, Jr. et al. | |
| 4,372,725 A | 2/1983 | Moore et al. | |
| 4,378,072 A | 3/1983 | Appleman et al. | |
| 4,457,389 A | 7/1984 | Voelz | |
| 4,599,030 A | 7/1986 | Skaalen et al. | |
| 4,773,346 A * | 9/1988 | Blanding et al. | 114/45 |
| 4,880,124 A | 11/1989 | Feider et al. | |
| 5,180,070 A | 1/1993 | Feider | |
| 5,967,348 A | 10/1999 | Jussila | |
| 6,206,127 B1 | 3/2001 | Zakula, Sr. et al. | |
| 6,692,185 B2 | 2/2004 | Colvard | |
| 7,252,299 B2 | 8/2007 | Wierzba et al. | |
| 7,546,929 B2 | 6/2009 | Wierzba et al. | |
| 7,614,829 B2 * | 11/2009 | Thomas, Jr. | 405/231 |
| 7,798,274 B2 | 9/2010 | Wierzba et al. | |
| 2003/0161708 A1 | 8/2003 | Johnston | |
| 2005/0236217 A1 | 10/2005 | Koelin et al. | |
| 2011/0024219 A1 | 2/2011 | Jorgensen et al. | |
| 2011/0108347 A1 | 5/2011 | Wierzba et al. | |

\* cited by examiner

*Primary Examiner* — Jonathan Snelting
(74) *Attorney, Agent, or Firm* — Staas & Halsey LLP

(57) ABSTRACT

The present disclosure relates to a vertical hydraulic cylinder axle arrangement that can receive flexible power lines through the cylinder. In particular, a hollow piston rod having a longitudinally extending passage through which hydraulic hoses and electrical lines can pass is incorporated into a heavy-load transporter. A portion of the piston rod defines a splined shaft to mechanically engage a rotating slew gear drive to permit omnidirectional steering. The piston rod extends downward to form a trunnion mount on which drive wheels can articulate laterally to conform to irregularities in various surfaces and other inclinations.

14 Claims, 9 Drawing Sheets

VERTICAL LIFTING AXLE FOR A CASK TRANSPORTER

CROSS REFERENCE TO RELATED APPLICATIONS

Not Applicable.

FIELD OF THE INVENTION

The present disclosure generally relates to a vertical lifting axle configuration for heavy material lifting equipment. More particularly, the vertical lifting axle configuration is suitable for use with a transporter for lifting and transporting casks associated with nuclear power facilities.

BACKGROUND INFORMATION

At the end of a nuclear fuel cycle, spent nuclear fuel is typically stored on-site for future reprocessing or subsequent long-term storage. For transportation, spent nuclear fuel is often stored in a spent fuel storage cask. Typically, the casks are cylindrical in shape, made of steel and/or concrete, and oft times are transported and stored in a vertical orientation. A typical storage cask will be roughly 12 feet in diameter and weigh approximately 180 tons.

Various methods have been devised to lift and transport these casks, however most existing methods have drawbacks regarding maneuverability. These methods include using heavy-haul trailers or mobilized hydraulic gantry cranes attached to crawler type carriers. Another cask transporter, currently in use, consists of a hydraulic gantry mounted on a frame having eight on-center rigid suspension axle assemblies on which are mounted 16 large foam filled aircraft tires. Each of the current transporters and methods requires lifting the casks with some configuration of an overhead lifting beam or crane. As these transporters use an overhead lifting configuration, the transporters and methods must conform to strict Nuclear Regulatory Commission (NRC) safety standards. These standards include stringent single failure proof restrictions.

In addition, existing cask transporters typically rely on variations in tire pressure and tire compression to maintain lateral equalized loading on otherwise rigid axles. The reliance on tire pressure and/or compression alone is inadequate and may lead to severe overloading of the tires and/or bearings, and is the Achilles heel of most conventional heavy load transporters and trailers.

There exists a need for a highly maneuverable transporter capable of adjustable leveling to negotiate non-level surfaces and a wide variety of road surfaces. In addition, there exists a need for a lifting transporter to securely lift and transport spent nuclear fuel storage casks while conforming to the NRC safety standards.

SUMMARY OF THE INVENTION

The present application relates to and discloses a hydraulic cylinder, a wheel assembly, and a heavy load transporter. In one embodiment, a hydraulic cylinder includes a cylinder barrel, and a hollow piston shaft extending through the cylinder barrel. The hollow piston shaft is rotatable about a central longitudinal axis of the hollow piston shaft and longitudinally displaceable within the cylinder barrel. The hydraulic cylinder also includes at least one flexible power line extending through the length of the hollow piston shaft.

In one aspect of the hydraulic cylinder, the hollow piston shaft is coupled to a powered device. The powered device may be a wheel or a powered tool. In another aspect, the powered device is electrically powered and the at least one flexible power line is an electrical power line. Similarly, in another aspect, the powered device is hydraulically powered and the at least one flexible power line is a hydraulic power line. In yet another aspect, the powered device is electrically and hydraulically powered and the at least one flexible power line includes an electric power line and a hydraulic power line. In one aspect, the hydraulic cylinder has a stroke of at least twelve inches.

In one embodiment, a wheel assembly includes a vertically oriented hydraulic cylinder having a hollow piston shaft extending coaxially through the hydraulic cylinder. The hollow piston shaft is rotatable and linearly displaceable along a vertical axis of the hydraulic cylinder. The wheel assembly also includes a powered drive wheel coupled to a bottom end of the hollow piston shaft, at least one flexible power line extending through the length of the piston shaft, and a slew gear drive for rotating the powered drive wheel about the vertical axis.

In one aspect, the vertical axis of the hydraulic cylinder is a central axis of the hydraulic cylinder. In another aspect, the powered drive wheel is coupled to the bottom end of the hollow piston shaft through a trunnion assembly. In yet another aspect, the powered drive wheel is electrically powered and the at least one flexible power line is an electrical power line. Similarly, in another aspect, the powered drive wheel is hydraulically powered and the at least one flexible power line is a hydraulic power line. Further, in one aspect, the powered device is electrically and hydraulically powered and the at least one flexible power line includes an electric power line and a hydraulic power line. In yet another aspect, the vertically oriented hydraulic cylinder has a vertical lift stroke of at least twelve inches.

In another embodiment, a wheel assembly includes a vertical hydraulic cylinder having a cylinder barrel and a hollow piston shaft that includes a top end, a bottom end, and a splined region proximal to the bottom end. The hollow piston shaft extends through the cylinder barrel and the cylinder barrel is displaceable along a length of the piston shaft via the application of a hydraulic fluid between at least one of a first end and a second end of the cylinder barrel and a piston of the piston shaft. The wheel assembly also includes at least one wheel coupled to a bottom end of the piston shaft and the wheel in electrical or hydraulic communication with a drive motor. The wheel assembly further includes at least one of an electrical line or a hydraulic line extending through the hollow piston shaft from a top end of the hollow piston shaft, out through the bottom end of the hollow piston shaft, and connected to the drive motor. The wheel assembly also includes a slew-gear rotation motor in mechanical communication with the splined region of the hollow piston shaft. The slew-gear rotation motor is configured to rotate the hollow piston shaft and wheel about a central longitudinal axis of the hollow piston shaft.

In one aspect, a degree of rotation for the hollow piston shaft is mechanically limited to a minimum necessary for omnidirectional travel. Similarly, in another aspect, a degree of rotation for the hollow piston shaft is electronically limited to a minimum necessary for omnidirectional travel. In yet another aspect, the wheel is coupled to the bottom end of the piston shaft through a trunnion assembly. In one aspect, the drive motor is affixed to the vertical hydraulic cylinder. In yet another aspect, the splined region of the hollow piston shaft is slidable perpendicular to the slew-gear rotation motor. In one aspect, the vertical hydraulic cylinder has a vertical lift stroke of at least twelve inches.

In one embodiment, a transporter for transporting a heavy load includes at least one vertical lifting axle. The at least one vertical lifting axle further includes a housing affixed to a frame of the transporter, a hydraulic cylinder having a cylinder barrel disposed with the housing for extending the vertical lifting axle to lift the heavy load, and a hollow piston shaft extending through the cylinder barrel. The hollow piston shaft is rotatable about a central longitudinal axis of the hollow piston shaft and longitudinally displaceable within the cylinder barrel.

The vertical lifting axle also includes a powered drive wheel coupled to a bottom end of the hollow piston shaft and a flexible power line extending through the length of the hollow piston shaft. A first end of the flexible power line is in communication with a power source located on the transporter and a second end of the flexible power line is in communication with the powered drive wheel.

In one aspect, the transporter is a bottom-carry transporter and the heavy load is vertically oriented. The transporter further includes a fixed first engagement member to engage the heavy load at a first bottom location, a retractable second engagement member to engage the heavy load at a second bottom location, and a retractable third engagement member to engage the heavy load at a third bottom location. In another aspect, the transporter further includes two or more vertical lifting axle groups having two or more vertical lifting axles, wherein the two or more vertical lifting axles of each vertical lifting axle group are in fluid communication with one another to exchange pressurized hydraulic fluid. In yet another aspect, the at least one vertical lifting axle has a vertical lift stroke of at least twelve inches.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive

DETAILED DESCRIPTION OF THE INVENTION

The present disclosure relates to a vertical lifting axle assembly and a transporter incorporating the vertical lifting axle assembly. In particular, the vertical lifting axle may be used for lifting and maneuvering spent fuels storage casks associated with nuclear facilities. The vertical lifting axle may also be used in a number of other heavy-load applications. In one embodiment, a heavy-load transporter having a number of the vertical lifting axles may used to carry large concrete cylinders containing spent fuel rods from nuclear reactors. The transporter may further include a number of large pneumatic aircraft-type tires, and rely on the vertical stroke on each independent axle assembly to negotiate major non-coplanar surfaces and a wide variety of road surfaces. The transporter disclosed herein engages the cask from underneath by inserting engagement members or lugs into the air vents in the base of the cask. By engaging the bottom of the cask and lifting only enough for the cask to clear the operating surface by a few inches, the single failure proof specifications as mandated by the Nuclear Regulatory Commission (NRC) may not apply, as the cask is always carried at the lowest possible ground clearance.

In various embodiments, the vertical lifting axle includes a long vertical hydraulic cylinder that receives a piston having a shaft that extends upward through a hole in the top of the cylinder. A number of suitable seals are used to prevent the loss of pressurized hydraulic fluid from the cylinder. The piston shaft defines a hollow lumen that extends from the through the top of the cylinder and down through the bottom of the hydraulic cylinder and towards the wheels of the axle assembly. The hollow piston shaft, thereby allows hydraulic and/or electrical lines to run from a power source at the transporter down through the piston and hydraulic cylinder where they may provide electrical and/or hydraulic fluid to the wheels and steering components of the vertical lifting axle.

Figure 1:
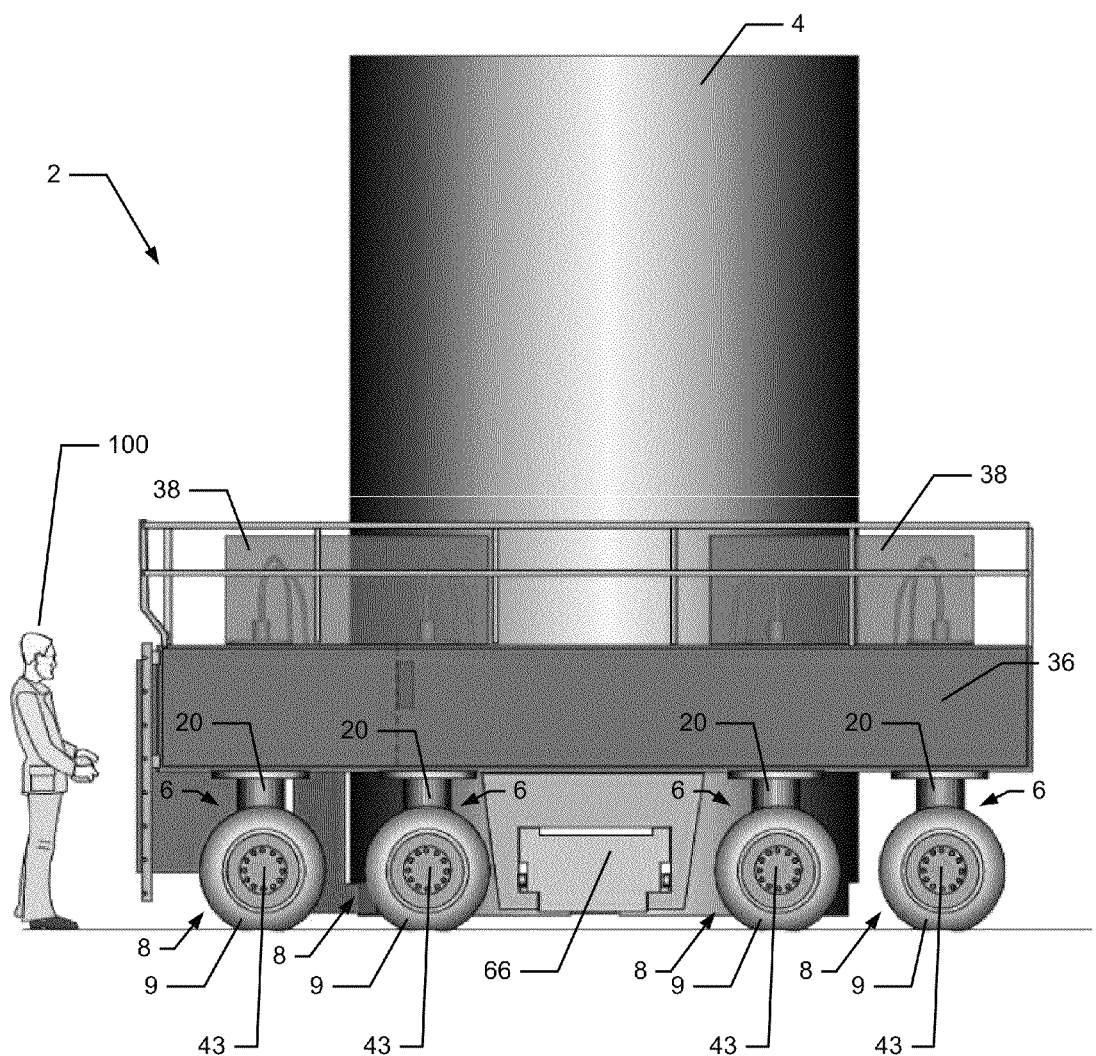
FIG. 1 is a side elevation of a cask transporter.
Figure 2:
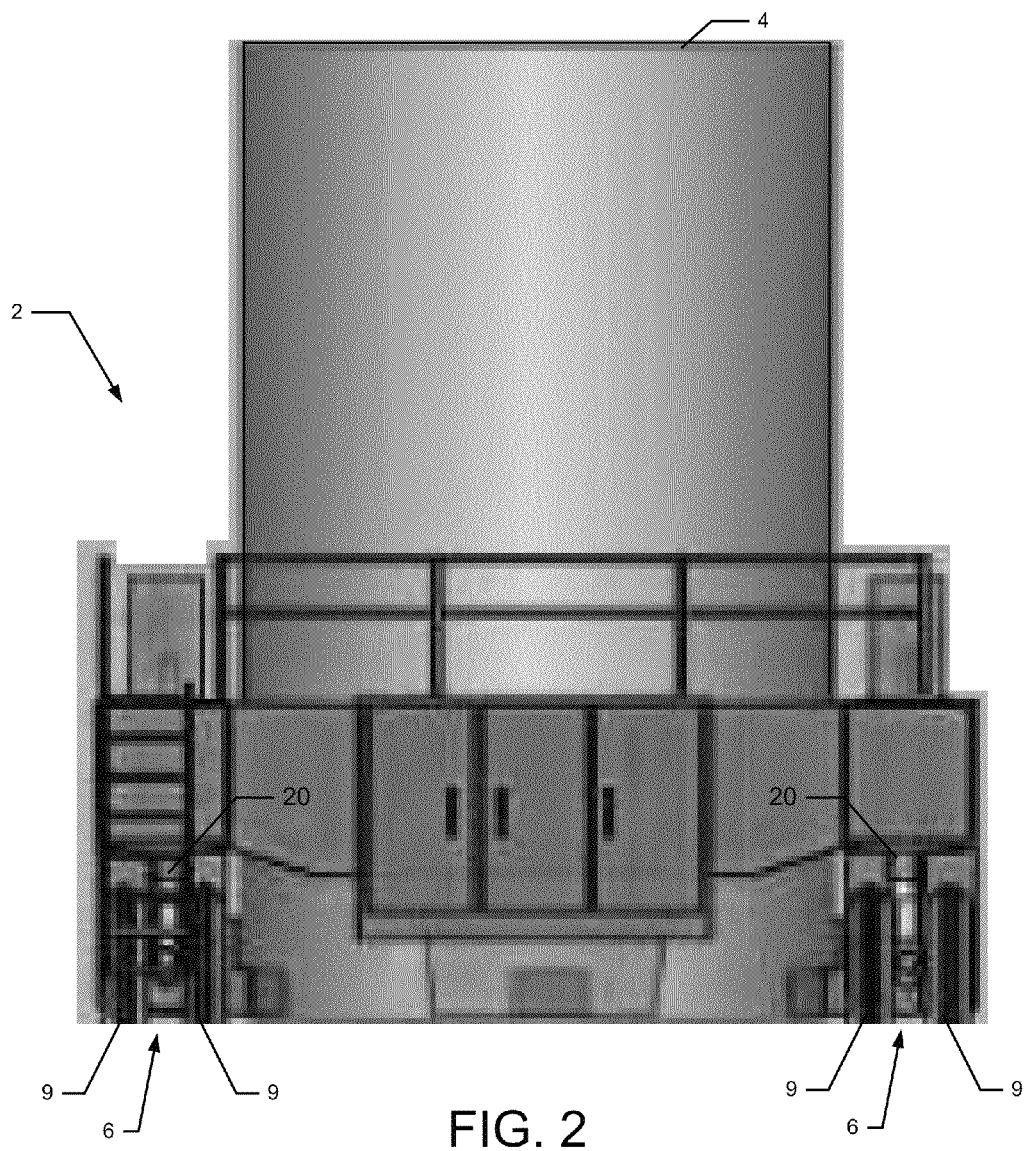
FIG. 2 is a front elevation of a cask transporter.
Figure 3:
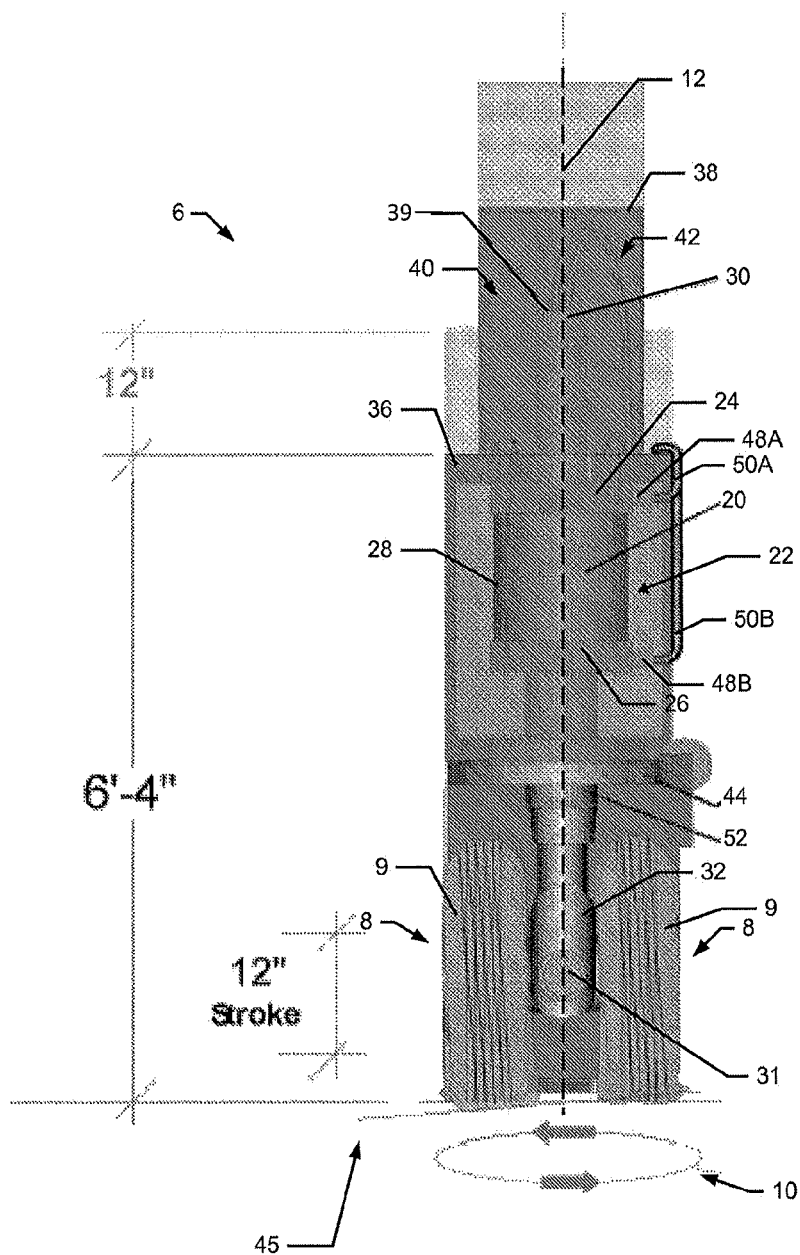
FIG. 3 is an end elevation of the vertical hydraulic assembly, wherein the vertical hydraulic assembly is shown in partial cross section.
Figures 4, 5:
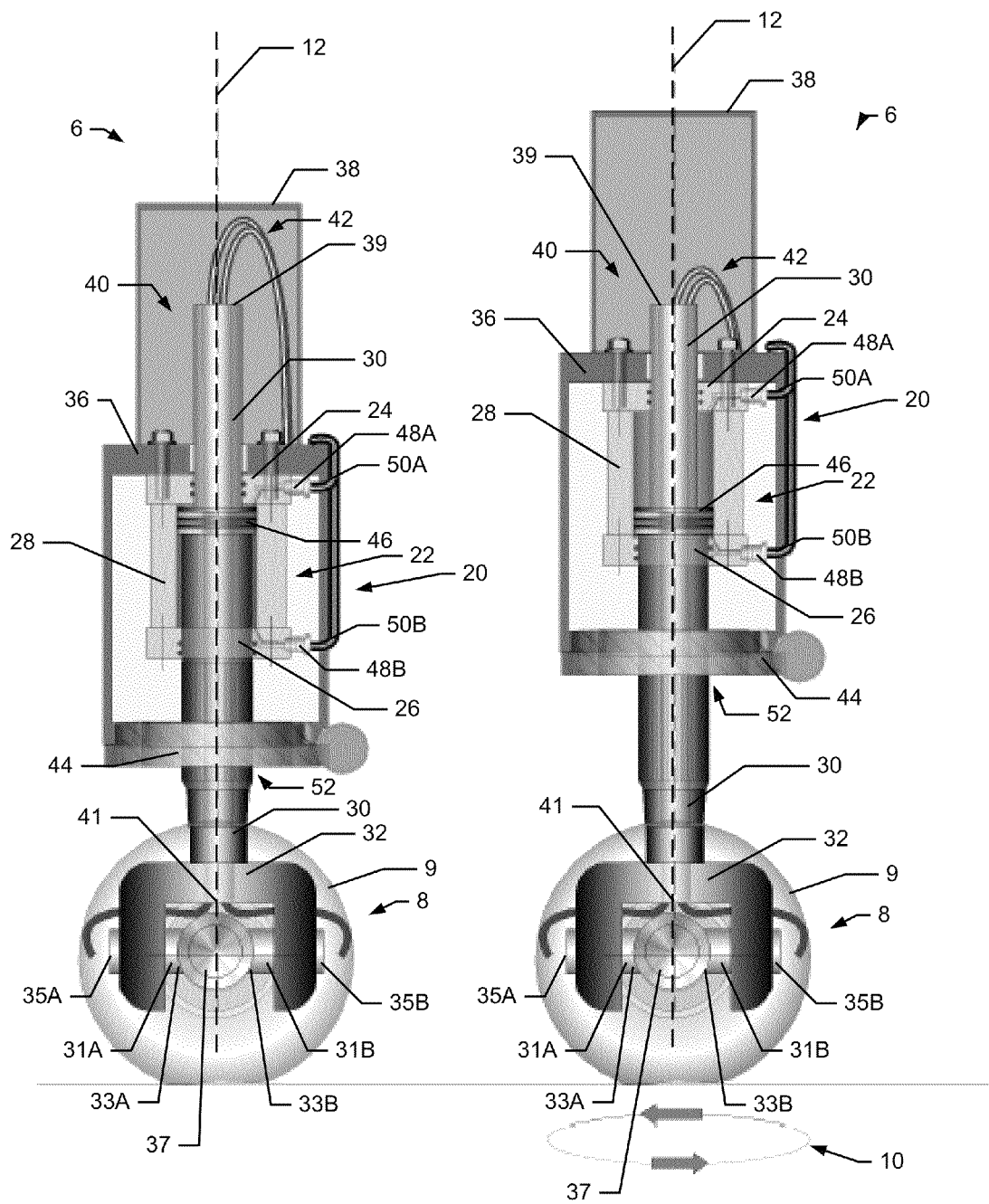
FIG. 4 is a half-section elevation of the vertical lifting axle in a retracted orientation, wherein the vertical lifting axle is shown in partial cross section.
FIG. 5 is a half-section elevation of the vertical lifting axle in an extended orientation, wherein the vertical lifting axle is shown in partial cross section.

Referring now to FIGS. 1 and 2, a transporter 2 for transporting heavy loads, such as the spent fuel cask 4, is shown having several pairs of one embodiment of the vertical lifting axle 6. Typically, the transporter 2 is used to maneuver loads weighing 100 tons and greater. In one embodiment, as shown, the transporter 2 employs eight hydraulic vertical lifting axles 6; however, transporters having greater or fewer vertical lifting axles may be used for cask transportation. As shown each vertical lifting axle 6, includes a pair of drive wheels 8, powered by a drive motor 37 engaged to a torque hub 43 of each drive wheel, as shown in FIGS. 4-5. Each pair of the drive wheels 8 is independently rotatable in a circle 10 about a vertical axis 12 of the respective vertical lifting axle 6, as shown in FIGS. 3 and 5.

Each of the vertical lifting axles 6 also includes a steerable vertical hydraulic shaft/piston assembly 20. In one embodiment, shown in FIGS. 3-5, the vertical hydraulic assembly 20 includes a vertical hydraulic cylinder 22 having a top end 24, a bottom end 26, and a cylinder barrel 28. The top end 24 and the bottom end 26 of the vertical hydraulic cylinder 22, each define an opening to receive and slidably engage a hollow piston shaft 30. The hollow piston shaft 30 extends through the bottom end 26 of the vertical hydraulic cylinder 22 and is coupled to the drive wheels 8. In various embodiments, the drive wheels 8 are coupled to the hollow piston shaft 30 through a forged yoke 32 formed at the bottom of the hollow piston shaft. The forged yoke 32 receives at least one trunnion pin 31 to form a trunnion assembly that allows an axle shaft 34 to articulate laterally, generally indicated as 45, for surface compliance to undulating terrain. In one embodiment shown, a single trunnion pin 31 that extends through the axle shaft 34 is received in the forged yoke to join the axle shaft 34 to the hollow piston shaft 30. In another embodiment, proximal ends 33A and 33 B of two trunnion pins 31A and 31B, respectively, are affixed to the axle shaft 34 while the distal ends 35A and 35B of each respective trunnion pin is received in the forged yoke 32 as shown in FIGS. 4-5. A trunnion mount is preferred as it permits the vertical lifting axle 6 to articulate laterally so that the tires 9 of the drive wheels 8 can conform to any irregularities in the surface over which the transporter 2 travels.

The top end 24 of the vertical hydraulic cylinder 22 is affixed to the deck frame 36 of the transporter 2. As shown, the deck frame 36 may also include an upper housing 38 positioned over the vertical hydraulic assembly 20. The upper housing 38 protects and conceals an upper portion 40 of the hollow piston shaft 30 as well as flexible power lines 42 that extend from a power source (not shown) at the transporter through the hollow piston shaft to one or more drive motor(s) 37 and braking system of the drive wheels 8.

The power source may be a hydraulic pump, a pneumatic pump, an electric power source, or other device that effectuates mechanical motion. The power source provides pressurized hydraulic fluid, pressurized gas, or electric power, respectively, through the flexible lines 42 to a powered device attached to the hollow piston shaft 30. The configuration of flexible lines 42 may vary according to the power source and powered device.

Figure 6:
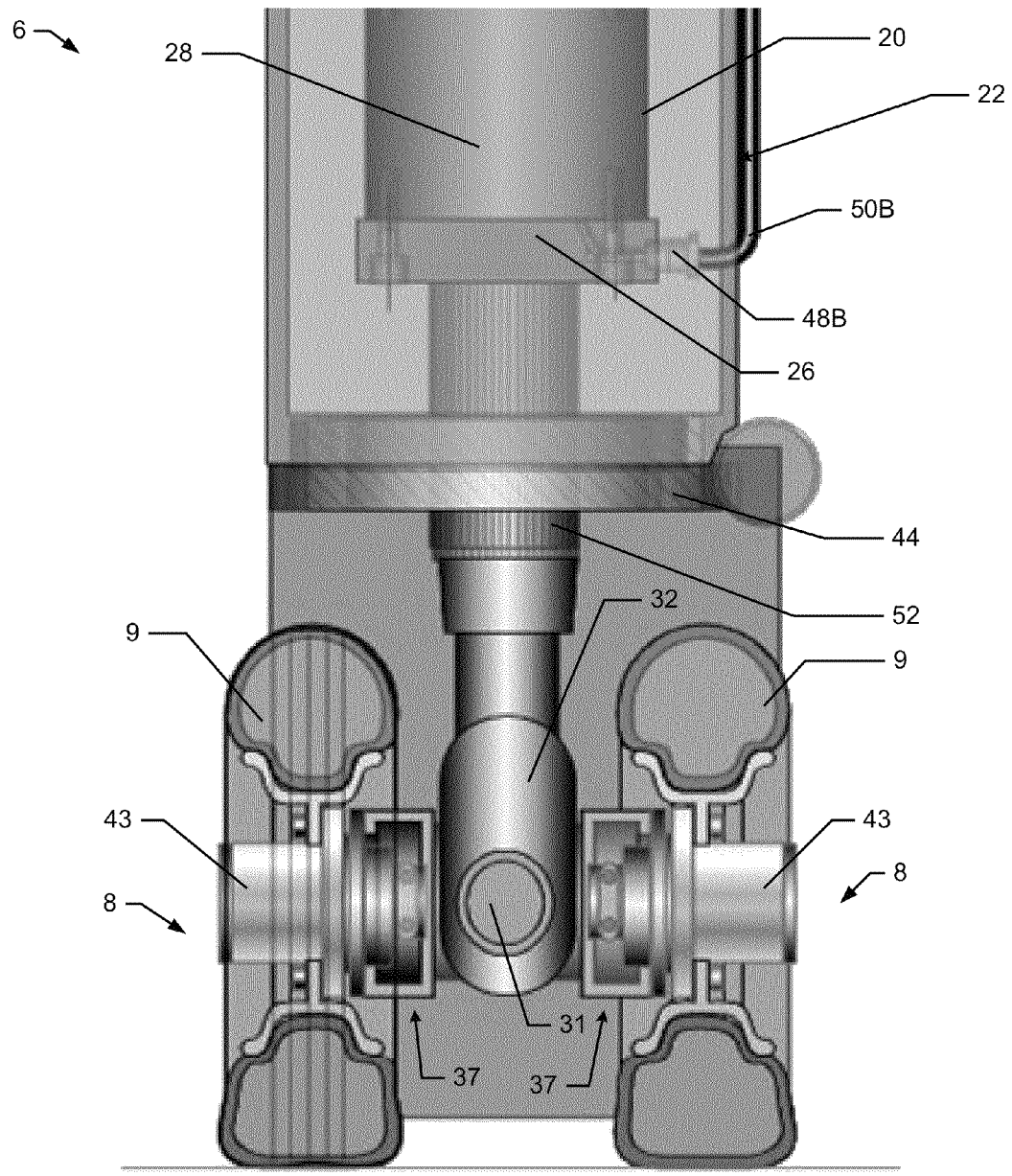
FIG. 6 is a half-section elevation of the vertical lifting axle, wherein the drive motor and drive wheel assemblies are shown in partial cross section.
Figure 7:
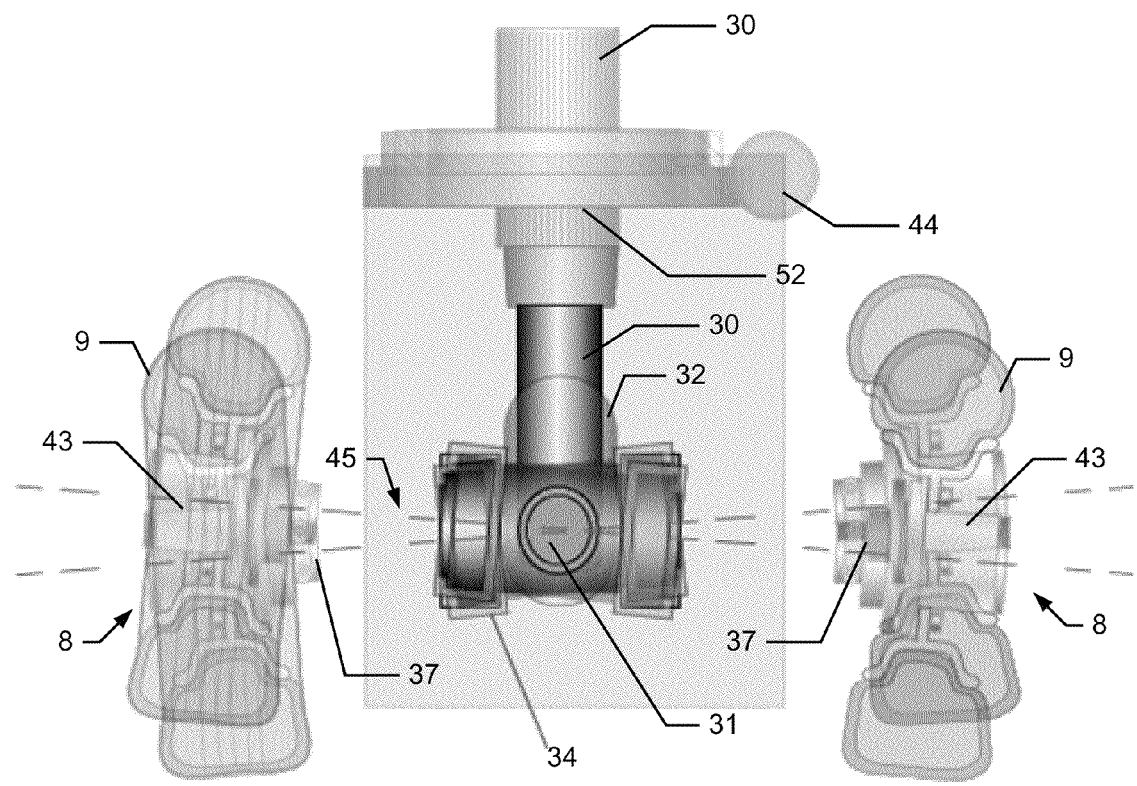
FIG. 7 is a half-section elevation of the vertical lifting axle illustrating the lateral articulation of the drive wheel assemblies.
Figure 8:
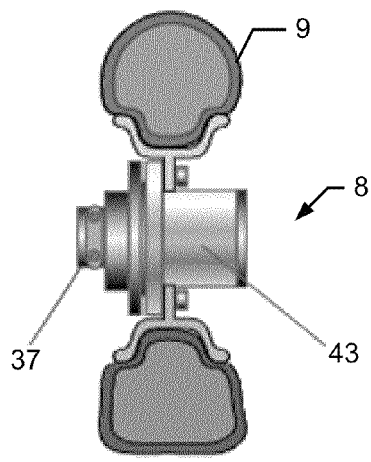
FIG. 8 is a half-section view of a drive wheel assembly.

The powered device may be the drive motor(s) 37 engaged to the torque hub 43 of each drive wheel 8. The drive motor(s) 37 generate torque around the axle shaft 34 to drive the drive wheels 8. Preferably, each drive wheel 8 is driven by its own corresponding drive motor 37 through independent torque hubs 43 that are plumbed to act as a differential, as shown in FIGS. 6-8. In another embodiment, a single drive motor 37 having a mechanical differential could be used.

Various other embodiments of the vertical lifting axle 6 may include additional or other powered devices. By way of example and not limitation, the flexible lines 42 may transmit pressurized hydraulic fluid to a rotating slew gear drive 44 located on or near the vertical lifting axle 6. In other examples, the flexible lines 42 may transmit a pressurized gas or electric signals to any of a variety of devices or tools located on or near the vertical lifting axle 6, including but not limited to pneumatic air brakes, electric motors, or actuators. In various embodiments, the flexible lines 42 include electronic control wires in communication with rotary encoders (not shown) incorporated into the drive wheels 8. The rotary encoders communicate with a computerized control system to monitor the exact revolutions of one or both drive wheels 8.

The hydraulic cylinder 22, and more specifically the hollow piston shaft 30, further includes a piston 46 that slidably engages the inner circumferential surface of the cylinder barrel 28. The piston 46 is concentrically centered about the hollow piston shaft 30 and statically affixed thereto. Preferably, the piston 46 is designed to apply ample force to lift its share of the entire transporter and its payload. The piston 46 also provides a fluid seal to prevent the pressurized hydraulic fluid from passing between the opposing chambers of the cylinder barrel 28.

The vertical hydraulic cylinder 22 further includes at least two hydraulic fluid ports 48A-B. The hydraulic fluid ports 48A-B are in communication with a hydraulic pump (not shown) through suitable respective hydraulic fluid lines 50A-B. Pumping pressurized hydraulic fluid into the cylinder barrel 28 through the top fluid port 48A increases the pressure therein to apply force to the piston 46 and the top end 24 causing the piston to move away from the top end, thereby causing the vertical lifting axle 6 to extend from its retracted length as shown in FIG. 4 to its extended length as show in FIG. 5. Conversely, pumping pressurized hydraulic fluid in to the bottom fluid port 48B causes the vertical lifting axle to retract and lowers transporter. The vertical hydraulic cylinder 22 has a vertical stroke between three and thirty-six inches. Preferably, the vertical hydraulic cylinder 22 has a vertical stroke of at least twelve inches.

As shown in FIGS. 3-5, the flexible power lines 42 extend from the transporter 2 through an open top 39 of the hollow piston shaft 30 downward through the piston shaft and out an open bottom 41 in the forged yoke 32. The flexible power lines 42 are then routed to the drive motors 37 of the drive wheels 8 and any other devices powered by the lines 42. In various embodiments, hydraulic power lines 42 extending through the vertical lifting axle 6 are plumbed in such a manner to allow pressurized hydraulic fluid to flow differentially to one or both of a pair of drive wheels 8. Similarly, the hydraulic power lines 42 extending through two or more vertical lifting axles 6 may be plumbed in such a manner to allow pressurized hydraulic fluid to flow differentially to one or more of the vertical lifting axles 6.

In various embodiments, steering for each vertical lifting axle 6 may be provided by any suitable drive and/or steering motors located on or near the vertical lifting axle 6. Steering of each vertical lifting axle 6 is preferably provided by a rotating slew gear drive 44 mechanically engaged with the hollow piston shaft 30. To engage the rotating slew gear drive 44, a lower region 52 of the hydraulic piston shaft 30 is manufactured or modified to define a number of vertically oriented splines. The lower region 52 of the piston shaft 30 is slidably and mechanically engaged with a rotating slew gear drive 44. For example, the piston shaft 30 slides linearly along the longitudinal axis 12 of the vertical axis 6 while remaining in communication with the gear drive 44, as the vertical lifting axle 6 is extended or retracted. In addition, the piston shaft can be rotated through the mechanical engagement with the slew gear drive 44 about the longitudinal axis 12.

This configuration permits multi-directional steering for the drive wheels 8 about the longitudinal axis 12. The rotating slew gear drive 44 acting upon the splined region 52 of the piston shaft may provide up to 360 degrees of rotation, although the steering arrangement for each vertical lifting axle, preferably includes a limiting mechanism to limit the rotation of the piston shaft to approximately 150 degrees; the minimum necessary for omnidirectional travel.

The flexible lines 42, by virtue of their extension through the hydraulic cylinder 22 and the hollow piston shaft 30, can twist and rotate through approximately 150 degrees of piston shaft rotation without excessive kinking, breakage or placing other debilitating stress on the lines. In particular, by extending through the vertical lifting axle, the flexible lines 42 need not wrap or twist around the exterior surfaces of the vertical lifting axle 6 as the drive wheels 8 are rotated, where they may be subjected to excessive tensile stress and/or impact damage.

Figure 9:
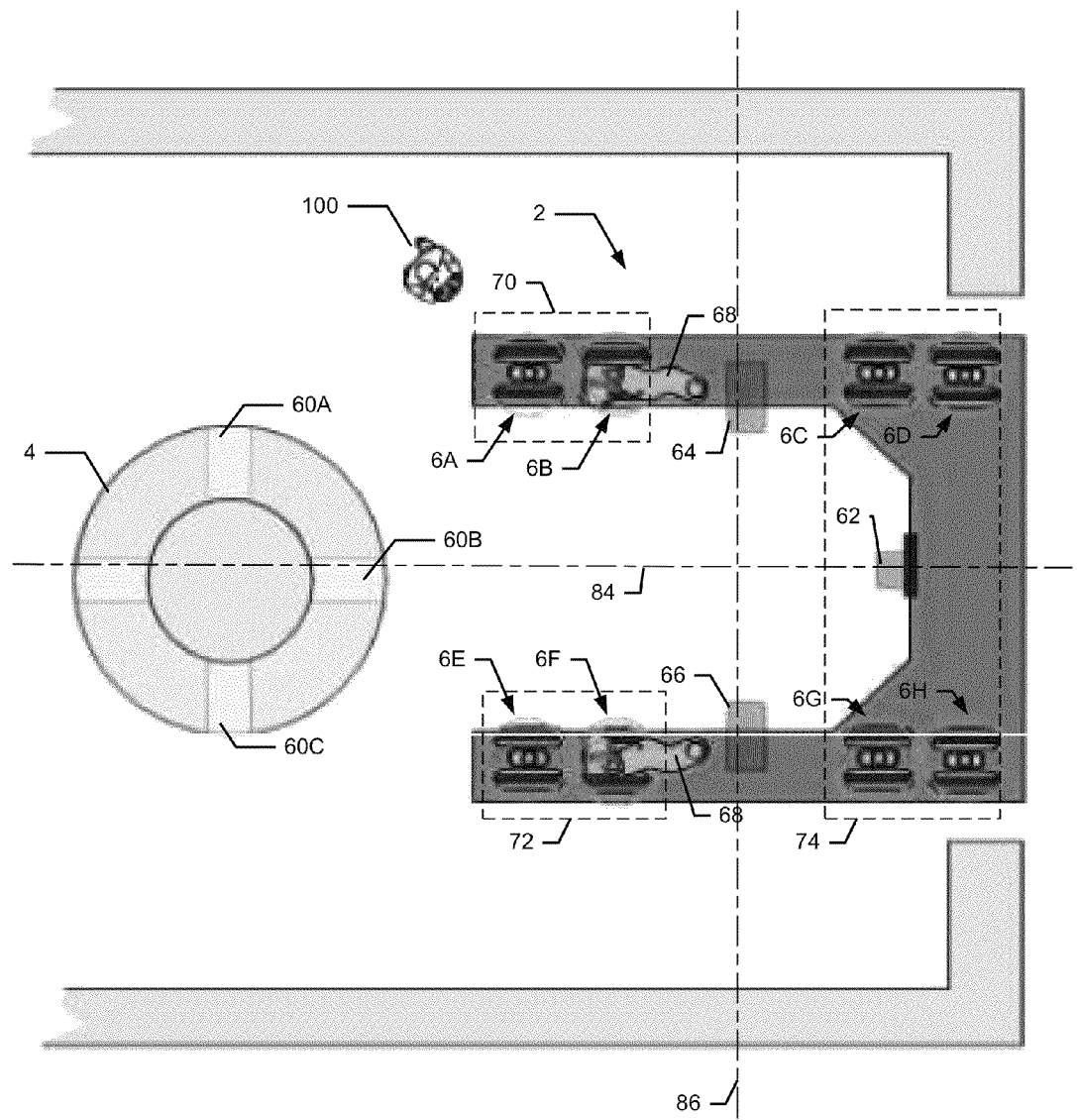
FIG. 9 is a plan view of a transporter prior to engaging and lifting a cask.
Figure 10:
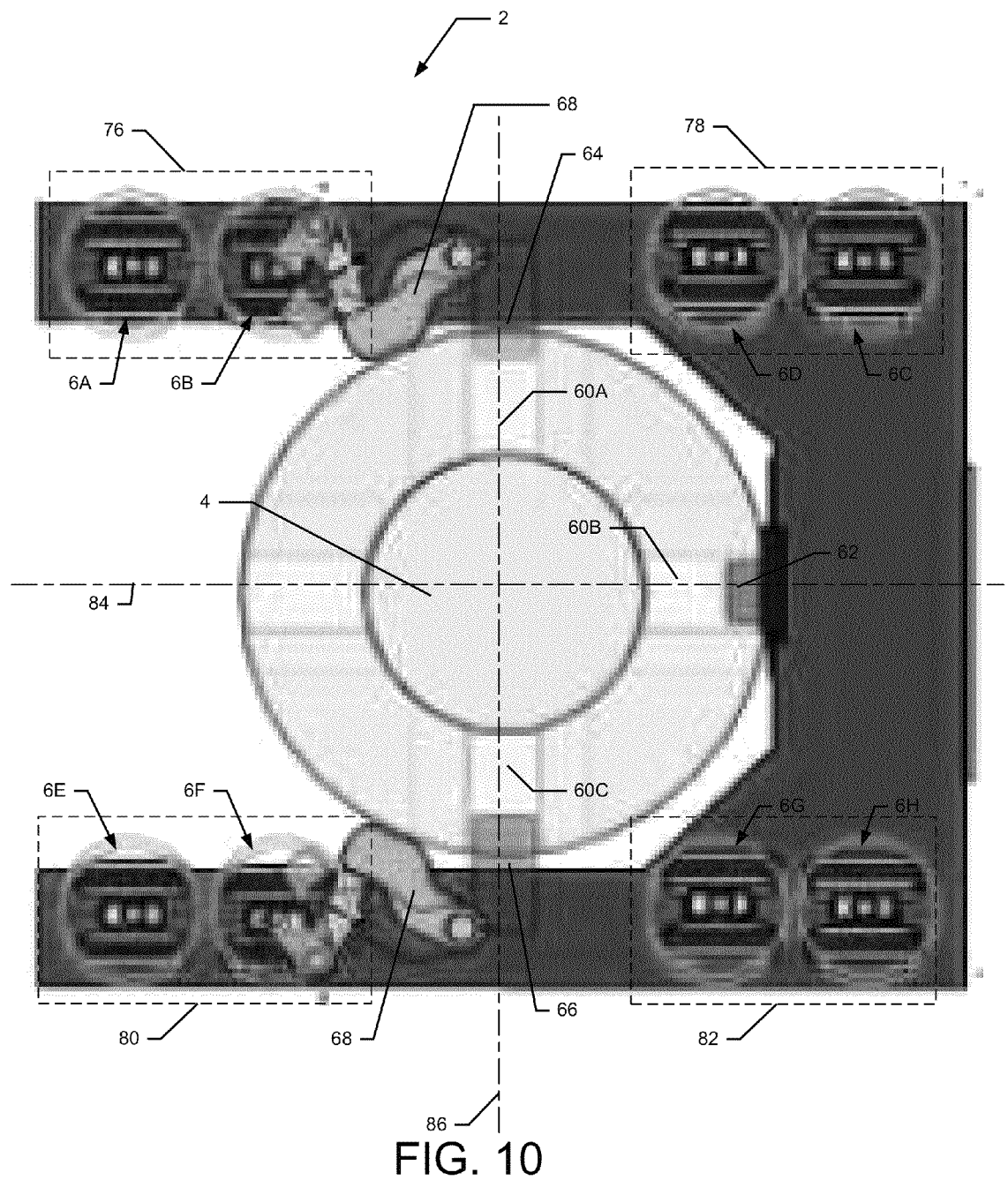
FIG. 10 is a plan view of a transporter engaged with a cask

Referring now to FIGS. 9-10, a transporter 2 that includes multiple vertical lifting axles 6A-H is shown. The transporter 2 is configured for lifting and moving a vertically oriented nuclear spent fuel storage cask 4, such as the Holtec® Hi-Storm 100, from the bottom of the cask. As shown, a vertically oriented cask 4 may be configured to include a number of air vents 60A-C or other recess, in its base. In this example, the transporter 2 engages the cask using a fixed engagement member 62 and two retractable engagement members 64 and 66. After maneuvering the transporter 2 to engage a first air vent 60B with the fixed engagement member 62, the retractable engagement members 64-66 are extended to engage the other air vents 60A and 60C. The retractable engagement members 64 and 66 may be extended and retracted using any suitable means. Preferably, the retractable engagement members 64-66 are driven by a rack and pinion drive arrangement.

Once the cask 4 as been engaged by the engagement members 62-66, the cask may be lifted by extending the vertical lifting axles 6A-H. The cask may be further secured to the transporter by a strap or other fail-safe mechanisms 68 prior to or after lifting.

As shown in FIG. 9, one embodiment of the transporter 2 includes eight vertical lifting axles 6A-H. A hydraulic and/or electric suspension circuit (not shown) links a multiple pairs of vertical lifting axles (e.g. 6A to 6B and 6E to 6F) to allow each pair of vertical lifting axles to exchange pressurized hydraulic fluid as an independent group, thereby forming two lift points 70 and 72 for stabilizing the cask 4. The remaining four vertical lifting axles 6C, 6D, 6G, and 6H have interconnecting hydraulic lines to permit the exchange of hydraulic fluid to equalize the load there between. By this arrangement, the transporter 2 provides a three lift-point 70-74 equalizing suspension for securing and leveling the loaded cask.

In a preferred embodiment as shown in FIG. 10, the load of the cask is distributed amongst four lift points or quadrants 76-82 formed by pairs of vertical lifting axles 6A-B, 6C-D, 6E-F, and 6G-H. In this embodiment, each fluidly-connected axle pair 6A-B, 6C-D, 6E-F, and 6G-H is fitted with a precision pressure transducer that communicates with a computerized control system (e.g. "SynchroSteer®") having a processor and a memory. Another suitable computerized control system may also be used. The computerized control system may therefore monitor the load distribution and maintain the desired lift pressure in each quadrant 76-82 for accurate tire contact pressure and load-point equalization.

The computerized control system also provides precision control for the lifting height of the transporter. In one embodiment, the computerized control system is in communication with a string potentiometer located in each vertical lifting axle 6A-H to provide accurate elevation data and control the extension of each vertical lifting axle. In another embodiment, each pair of vertical lifting axles 6A-B, 6C-D, 6E-F, and 6G-H includes a string potentiometer.

Figure 11:
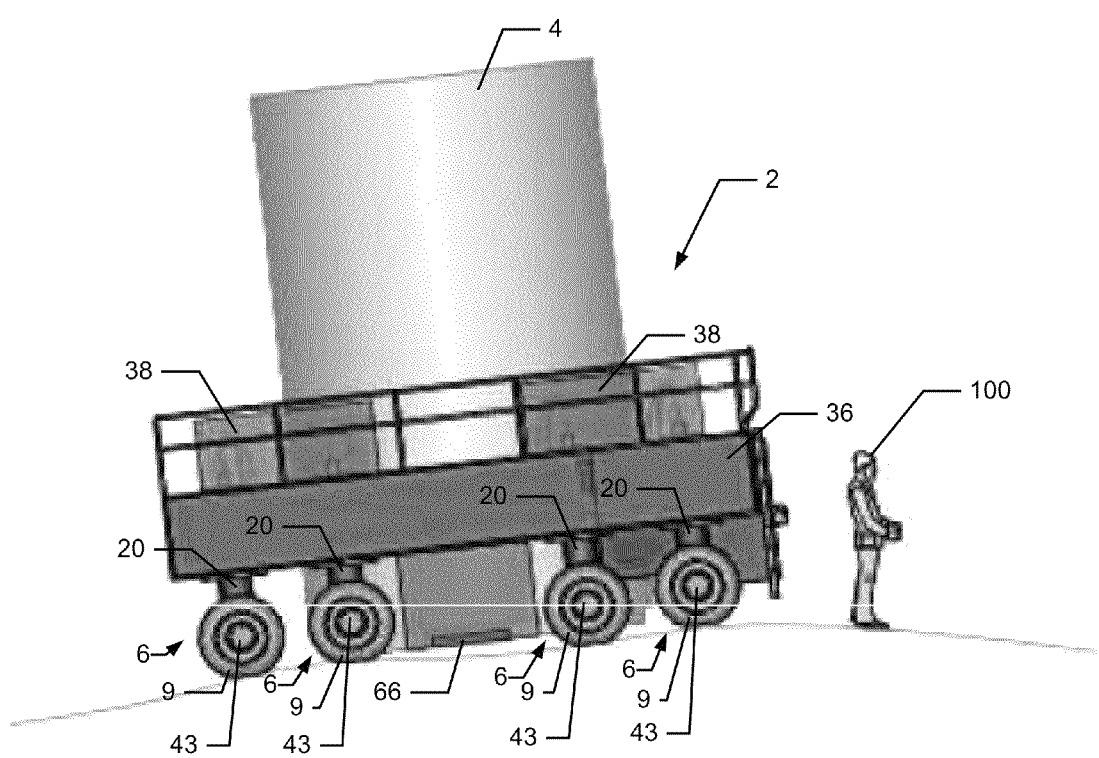
FIG. 11 is a side elevation of a cask transporter transporting a cask over an incline.

The computerized control system may be located on the transporter 2 and may be accessed and controlled wirelessly from anywhere on the transporter 2 or remotely away from the transporter, which allows an operator 100 to remain a safe distance away from any radioactive emissions that may emanate from the cask 4. The load distribution for each axle pair 6A-B, 6C-D, 6E-F, and 6G-H and/or lift points 76-82, may be transmitted to the computerized control system through wired or wireless transmissions. The load information may be displayed on a display device for an operator 100 of the transporter 2 to identify the weight of the load and the position of the load's center-of-gravity. The computerized control system allows the operator 100 to control the lift height, as well as the yaw, pitch, and/or roll of the lifted cask 4. The four lift point configuration and computerized control system are well suited to provide precise and automatic load leveling capabilities when transporting heavy level-sensitive loads on inclined or otherwise non-level planes, as shown FIG. 11.

In various embodiments, the arrangements of the vertical lifting axles 6 are well suited for performing maintenance on the transporter 2. For example, in the event of a motor failure or tire failure, the operator 100 can "dial-out" any axle assembly 6A-H using the computerized control system. The operator 100 can retract one or more vertical lifting axles 6A-H, thereby distributing the load to the remaining axles. Maintenance or other repairs, as necessary, may then be performed without requiring the loaded cask 4 to be lowered.

The computerized control system and the vertical lifting axle arrangement also minimize "tire scrubbing." The continuous monitoring of the load placed on each vertical lifting axle 6A-H or pairs thereof, coupled with the lateral articulation of each vertical lifting axle to conform to any surface irregularities through the forged yoke 32 and trunnion pin 31 arrangement, which assures that no drive wheel 8 takes on more than its assigned load under any condition. Further, the rotation of each vertical lifting axle 6A-H ensures that the drive wheels 8 are always individually rolling about a true center point. Various algorithms executed by the computerized control system further assure that every axle is either parallel to each other or all are turning in relation to a floating center-point somewhere along the X centerline 84 or the Y centerline 86 of the transporter. The computerized control system also permits rotation about a variety of preprogrammed center points that can be anywhere in the plane of the transporter 2.

All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto may vary.

The above specification and examples provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A wheel assembly comprising:
    a vertically-oriented hydraulic cylinder including a cylinder barrel and a hollow piston shaft extending coaxially through the cylinder barrel, wherein the hollow piston shaft is rotatable relative to the cylinder barrel and linearly displaceable along a vertical axis of the cylinder barrel;
    a powered drive wheel coupled to a bottom end of the hollow piston shaft;
    at least one flexible power line extending through the length of the piston shaft; and
    a slew gear drive for rotating the powered drive wheel about the vertical axis.

2. The wheel assembly of claim 1, wherein the vertical axis of the cylinder barrel is a central axis of the cylinder barrel.

3. The wheel assembly of claim 1, wherein the powered drive wheel is coupled to the bottom end of the hollow piston shaft through a trunnion assembly.

4. The wheel assembly of claim 1, wherein the powered drive wheel is electrically powered and the at least one flexible power line is an electrical power line.

5. The wheel assembly of claim 1, wherein the powered drive wheel is hydraulically powered and the at least one flexible power line is a hydraulic power line.

6. The wheel assembly of claim 1, wherein the powered device is electrically and
hydraulically powered and the at least one flexible power line includes an electric power line and a hydraulic power line.

7. The wheel assembly of claim 1, wherein the vertically oriented hydraulic cylinder has a vertical lift stroke of at least twelve inches.

8. A wheel assembly comprising:
a vertical hydraulic cylinder including a cylinder barrel and a hollow piston shaft having a top end, a bottom end, and a splined region proximal to the bottom end, wherein the hollow piston shaft extends through the cylinder barrel, the cylinder barrel displaceable along a length of the piston shaft via application of a hydraulic fluid between at least one of a first end and a second end of the of the cylinder barrel and a piston of the piston shaft;
at least one wheel coupled to a bottom end of the piston shaft, the wheel configured to be driven by a drive motor near the bottom end of the hollow piston shaft;
at least one of an electrical line or a hydraulic line extending through the hollow piston shaft from a top end of the hollow piston shaft, out through the bottom end of the hollow piston shaft, and connected to the drive motor; and
a slew-gear rotation motor in mechanical communication with the splined region of the hollow piston shaft, the slew-gear rotation motor to rotate the hollow piston shaft and wheel about a central longitudinal axis of the hollow piston shaft.

9. The wheel assembly of claim 8, wherein a degree of rotation for the hollow piston shaft is mechanically limited to a minimum necessary for omnidirectional travel.

10. The wheel assembly of claim 8, wherein a degree of rotation for the hollow piston shaft is electronically limited to a minimum necessary for omnidirectional travel.

11. The wheel assembly of claim 8, wherein the wheel is coupled to the bottom end of the piston shaft through a trunnion assembly.

12. The wheel assembly of claim 8, wherein the drive motor is supported on a hub of
the at least one wheel.

13. The wheel assembly of claim 8, wherein the splined region of the hollow piston shaft is slidable perpendicular to a plane of rotation of the slew gear.

14. The wheel assembly of claim 8, wherein the vertical hydraulic cylinder has a vertical lift stroke of at least twelve inches.

\* \* \* \* \*

UNITED STATES PATENT AND TRADEMARK OFFICE
CERTIFICATE OF CORRECTION

| | |
|---|---|
| PATENT NO. | : 9,108,556 B2 |
| APPLICATION NO. | : 13/298034 |
| DATED | : August 18, 2015 |
| INVENTOR(S) | : Melvin Dean Terry |

It is certified that error appears in the above-identified patent and that said Letters Patent is hereby corrected as shown below:

In the claims,

Claim 8, Column 9, Line 26

After "second end" delete "of the" (1st occurrence).

Signed and Sealed this
First Day of December, 2015

Michelle K. Lee
*Director of the United States Patent and Trademark Office*